US008886914B2

(12) United States Patent
Huang

(10) Patent No.: US 8,886,914 B2
(45) Date of Patent: Nov. 11, 2014

(54) MULTIPLEX RESTORE USING NEXT RELATIVE ADDRESSING

(75) Inventor: Ai Huang, Beijing (CN)

(73) Assignee: CA, Inc., Islandia, NY (US)

( * ) Notice: Subject to any disclaimer, the term of this patent is extended or adjusted under 35 U.S.C. 154(b) by 817 days.

(21) Appl. No.: 13/034,209

(22) Filed: Feb. 24, 2011

(65) Prior Publication Data

US 2012/0221802 A1 Aug. 30, 2012

(51) Int. Cl.
*G06F 12/00* (2006.01)
*G06F 3/06* (2006.01)
*G06F 11/14* (2006.01)

(52) U.S. Cl.
CPC .............. *G06F 3/0673* (2013.01); *G06F 3/064* (2013.01); *G06F 11/1469* (2013.01); *G06F 3/061* (2013.01); *G06F 11/1435* (2013.01)
USPC ............................. 711/220; 711/162; 711/137

(58) Field of Classification Search
CPC .................................................. G06F 11/1458
See application file for complete search history.

(56) References Cited

U.S. PATENT DOCUMENTS

| | | | | |
|---|---|---|---|---|
| 6,144,970 | A | 11/2000 | Bonner et al. | 707/206 |
| 6,233,602 | B1 | 5/2001 | Van Venrooy et al. | 709/203 |
| 7,281,006 | B2 | 10/2007 | Hsu et al. | 707/6 |
| 7,480,782 | B2 | 1/2009 | Garthwaite | 711/170 |
| 7,487,138 | B2 | 2/2009 | Borthakur et al. | 707/2 |
| 7,587,569 | B2 | 9/2009 | Uppala | 711/165 |
| 7,636,767 | B2 | 12/2009 | Lev-Ran et al. | 709/218 |
| 7,716,449 | B2 | 5/2010 | Kessler | 711/170 |
| 7,725,437 | B2 | 5/2010 | Kirshenbaum et al. | 707/640 |
| 7,756,817 | B2 | 7/2010 | Merchia et al. | 707/102 |
| 7,809,908 | B2 | 10/2010 | Chen | 711/162 |
| 2007/0150877 | A1 | 6/2007 | Emmett et al. | 717/149 |
| 2007/0156998 | A1 | 7/2007 | Gorobets | 711/170 |
| 2008/0243958 | A1 | 10/2008 | Prahlad et al. | 707/204 |
| 2008/0270436 | A1 | 10/2008 | Fineberg et al. | 707/101 |
| 2008/0282047 | A1 | 11/2008 | Arakawa et al. | 711/162 |
| 2009/0077028 | A1 | 3/2009 | Gosby | 707/3 |
| 2009/0083563 | A1 | 3/2009 | Murase | 713/324 |
| 2009/0112951 | A1 | 4/2009 | Ryu et al. | 707/205 |
| 2009/0300321 | A1 | 12/2009 | Balachandran et al. | 711/216 |
| 2009/0313248 | A1 | 12/2009 | Balachandran et al. | 707/6 |
| 2010/0198832 | A1 | 8/2010 | Jones | 707/741 |
| 2010/0205369 | A1 | 8/2010 | Chang et al. | 711/113 |
| 2010/0228800 | A1 | 9/2010 | Aston et al. | 707/822 |
| 2010/0235372 | A1 | 9/2010 | Camble et al. | 707/758 |

OTHER PUBLICATIONS

Pending U.S. Appl. No. 13/034,324 entitled Multiplex Backup Using Next Relative Addressing in the name of Ai Huang; 30 total pages, Filed Feb. 24, 2011.

(Continued)

*Primary Examiner* — Baboucarr Faal
(74) *Attorney, Agent, or Firm* — Baker Botts, L.L.P.

(57) ABSTRACT

According to one embodiment of the present disclosure, a method for multiplex restore using next relative address may be provided. The method may include identifying an address of a first data chunk of a file stored on a storage device. The first data chunk may be read by accessing the storage device at the address of the first data chunk. A next relative address appended to the first data chunk may be identified. The next relative address may indicate a position of a next chunk. The next chunk may comprise a next data chunk of the file or an empty chunk associated with the file. The method may further include reading the next chunk by accessing the storage device at the position indicated by the next relative address.

21 Claims, 3 Drawing Sheets

(56) References Cited

OTHER PUBLICATIONS

USPTO, Final Office Action for U.S. Appl. No.13/034,324 entitled *Multiplex Backup Using Next Relative Addressing* in the name of Ai Huang; Jul. 8, 2013.

Ai Huang, U.S. Appl. No. 13/034,324, filed Feb. 24, 2011; Notice of Appeal, Sep. 9, 2013.

Ai Huang, U.S. Appl. No. 13/034,324, filed Feb. 24, 2011; Appeal Brief, Nov. 11, 2013.

USPTO, Nonfinal Office Action for U.S. Appl. No. 13/034,324 entitled Multiplex Backup Using Next Relative Addressing in the name of Ai Huang; Dec. 24, 2012.

Response to Nonfinal Office Action dated Dec. 24, 2012 for U.S. Appl. No. 13/034,324 entitled Multiplex Backup Using Next Relative Addressing in the name of Ai Huang; Mar. 8, 2013.

Ai Huang, U.S. Appl. No. 13/034,324, filed Feb. 24, 2011; Examiner's Answer to Appeal Brief, Mar. 14, 2014.

MULTIPLEX RESTORE USING NEXT RELATIVE ADDRESSING

TECHNICAL FIELD

This invention relates generally to the field of data backup and restoration and more specifically to multiplex restore using next relative addressing.

BACKGROUND

In typical backup systems, a file may be divided into one or more chunks that are stored on a backup storage device. In some situations, all chunks of one file are written sequentially to the backup storage device before the next file is written. In other situations, the chunks of one file may not be contiguously written to the backup storage device. As an example, in multiplexed backup, various files may be backed up simultaneously, and the chunks of a file may be interleaved with chunks of other files as they are written to the backup storage device. In some systems, an index table may be created in order to track the locations of the chunks and to associate the chunks with their respective files. A file may be restored by reading each chunk of the file at the address of the backup storage device specified in the index table.

SUMMARY OF THE DISCLOSURE

In accordance with the present disclosure, disadvantages and problems associated with previous techniques for multiplex restoration of files may be reduced or eliminated.

According to one embodiment of the present disclosure, a method for multiplex restore using next relative address may be provided. The method may include identifying an address of a first data chunk of a file stored on a storage device. The first data chunk may be read by accessing the storage device at the address of the first data chunk. A next relative address appended to the first data chunk may be identified. The next relative address may indicate a position of a next chunk. The next chunk may comprise a next data chunk of the file or an empty chunk associated with the file. The method may further include reading the next chunk by accessing the storage device at the position indicated by the next relative address.

Certain embodiments of the disclosure may provide one or more technical advantages. A technical advantage of one embodiment may be that chunks of a file may include next relative addresses of other chunks of the file. Another technical advantage of one embodiment may be that the size of an index table is minimized by storing an address of one chunk associated with each file index in the index table.

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION OF THE DRAWINGS

Figure 1:
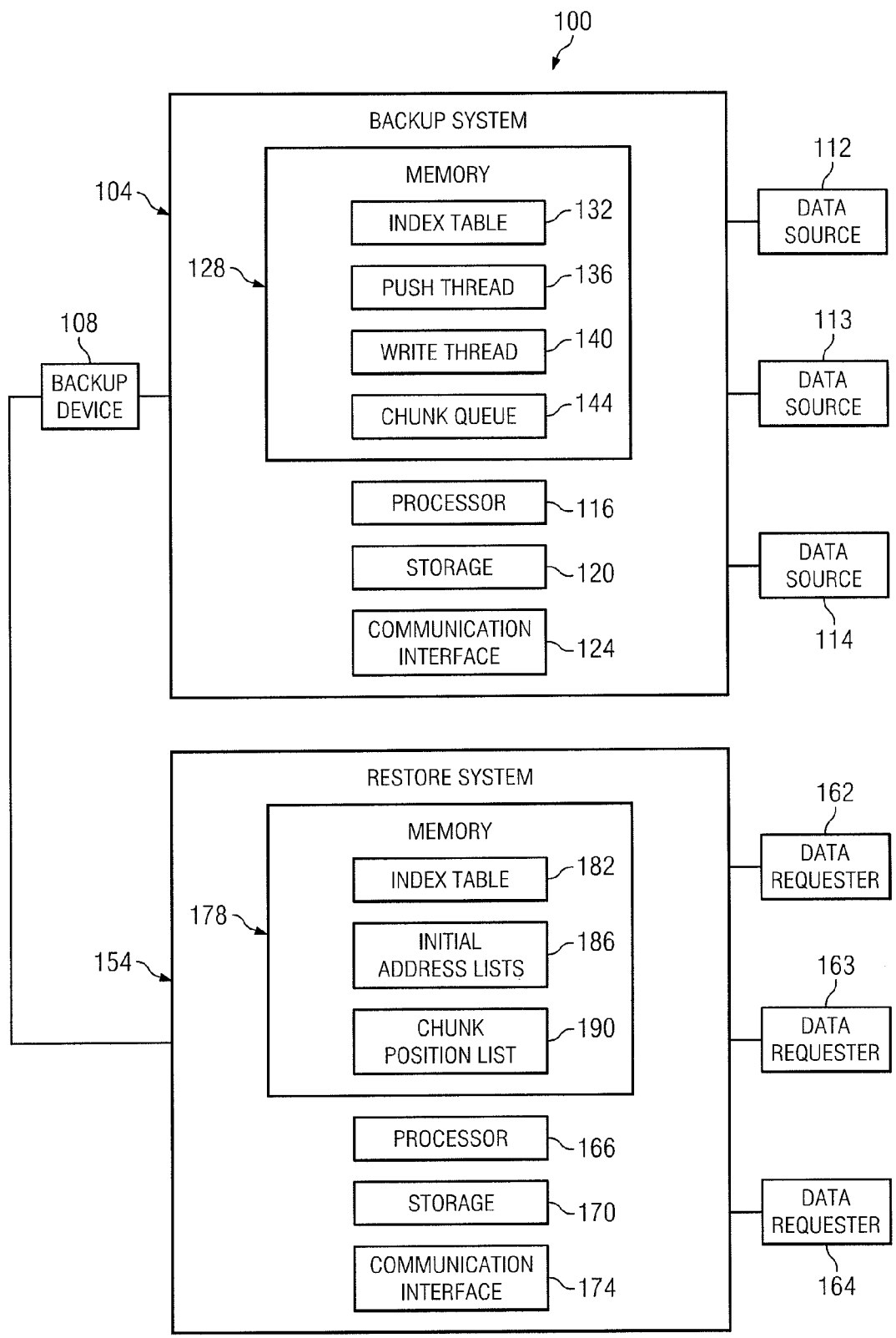
FIG. 1 depicts an example of a system for multiplex backup and restore using next relative addressing.
Figure 2:
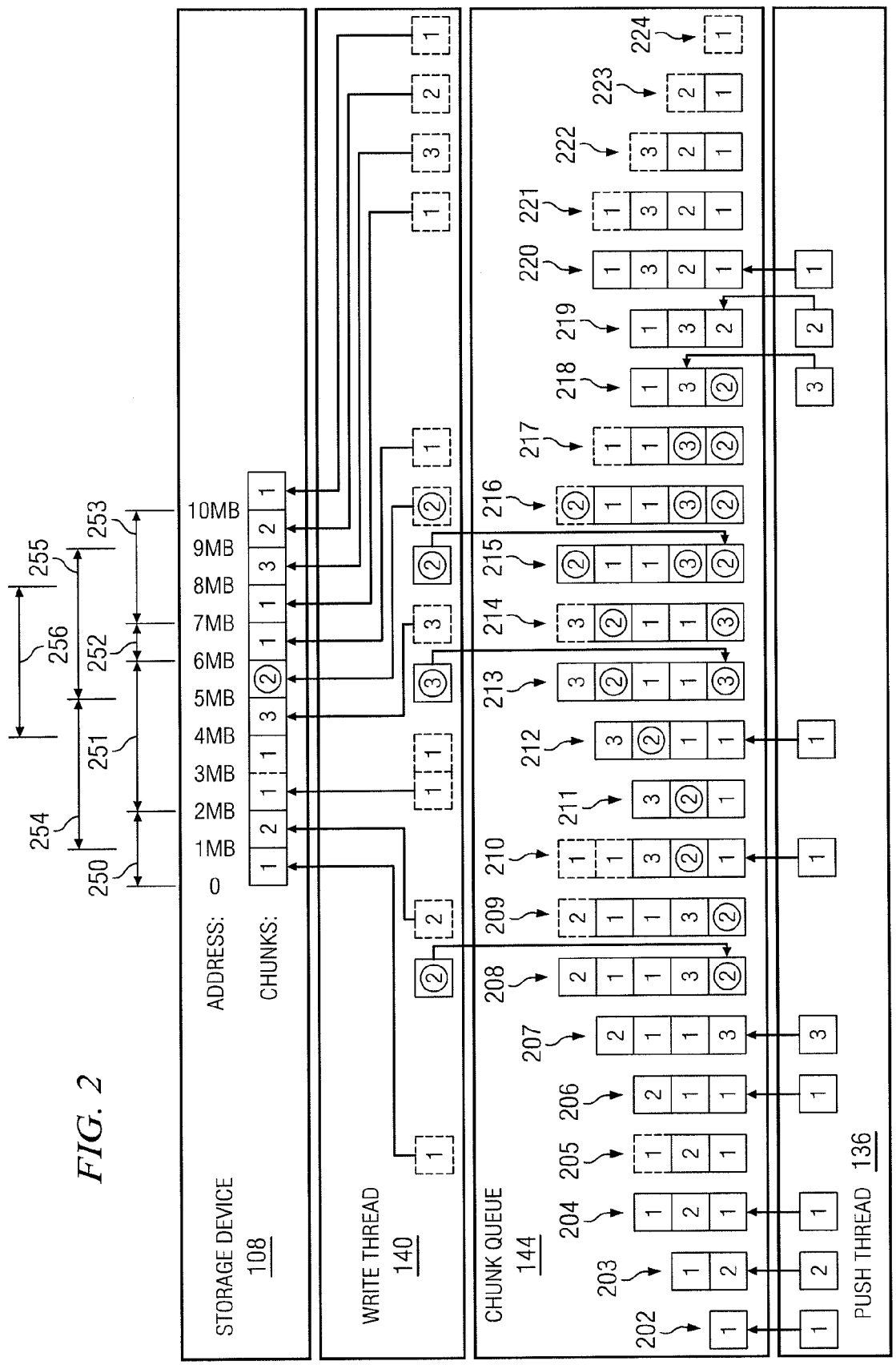
FIG. 2 depicts an example flow of multiplex backup using next relative addressing.
Figure 3:
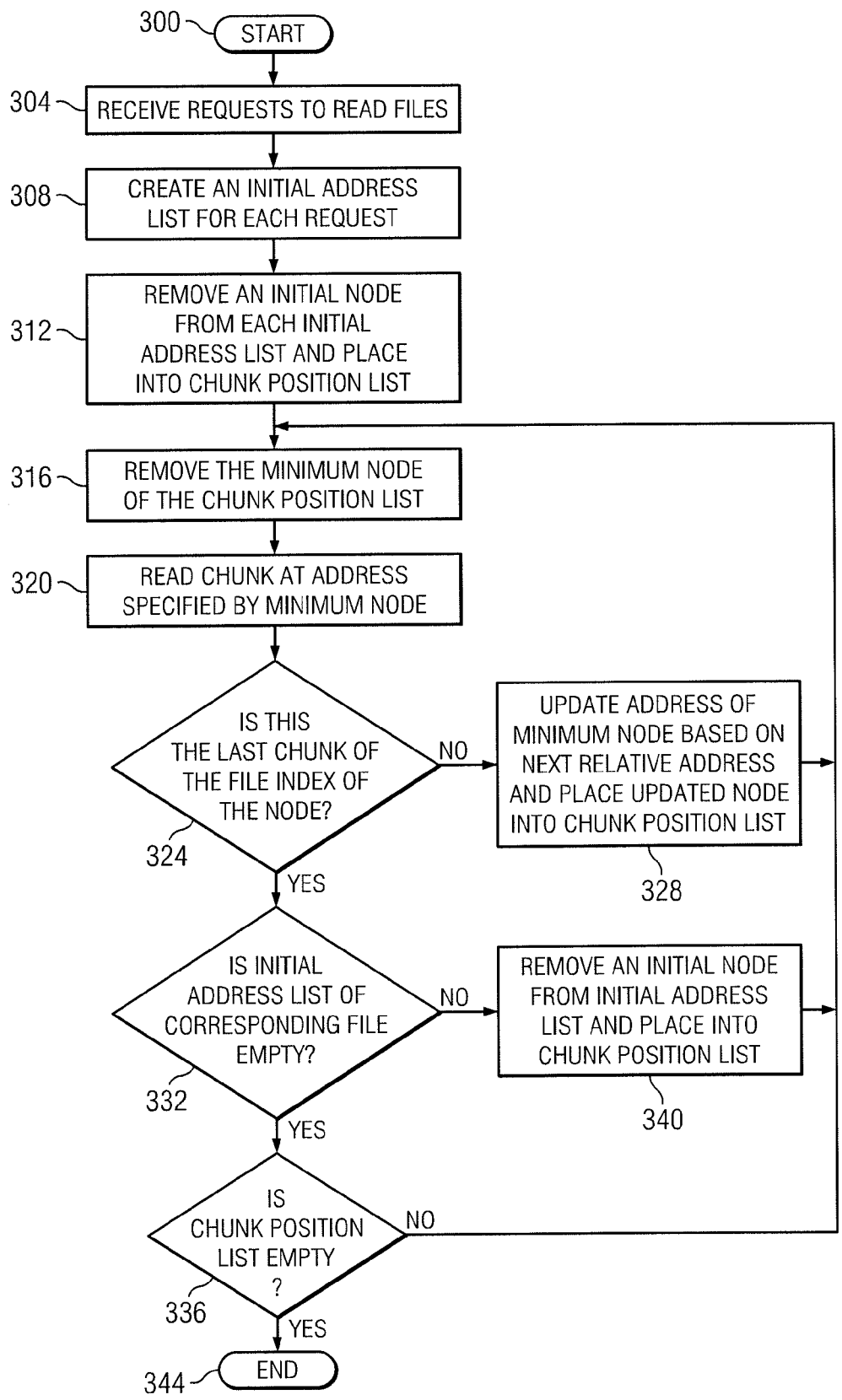
FIG. 3 depicts an example method of multiplex restore using next relative addressing.

Embodiments of the present disclosure and its advantages are best understood by referring to FIGS. 1-3 of the drawings, like numerals being used for like and corresponding parts of the various drawings.

FIG. 1 depicts an example of a system 100 for multiplex restore using next relative addressing. The system 100 may include a backup system 104 operable to receive a first chunk associated with a first file and a second chunk associated with the first file. The backup system may be operable to append a next relative address to the first chunk. The next relative address may indicate a position in a storage device 108. The backup system 104 may be operable to write the first chunk with the next relative address to the storage device 108 at a first address. The backup system 104 may also be operable to write the second chunk to the storage device 108 at the position indicated by the next relative address of the first chunk.

In typical backup systems, a file may be divided into one or more chunks that are stored on a backup storage device. In some situations, all chunks of one file are written sequentially to the backup storage device before the next file is written. In other situations, the chunks of one file may not be contiguously written to the backup storage device. As an example, in multiplexed backup, various files may be backed up simultaneously, and the chunks of a file may be interleaved with chunks of other files as they are written to the backup storage device.

In some systems, an index table may be created in order to track the locations of the chunks and to associate the chunks with their respective files. A particular file may be restored by reading each chunk of the file at the address of the backup storage device specified in the index table. Such a backup scheme may result in a very large index table if many files and/or large files are backed up on the backup storage device. The frequent accessing of the index table when a file is backed up or restored may result in a significant performance decrease.

In some embodiments, chunks associated with a file each include the address of the next chunk associated with the file. In some embodiments, a next relative addressing scheme may be used where each address of a next chunk associated with the file is expressed as a location relative to the location of the chunk that includes the address. In particular embodiments, an index table may include the absolute address (i.e., a fixed address that identifies a location on a storage device that is not dependent on another address) of the first chunk associated with the file and omit the addresses of subsequent chunks, thus significantly reducing the amount of entries in the index table. When the file is restored, the first chunk associated with the file is read by accessing the backup storage device at the address specified by the index table. The second chunk associated with the file is found by accessing the backup storage device at the address specified by the first chunk. The third chunk may be found by accessing the backup storage device at an address specified by the second chunk. This process may be repeated until the last chunk of the file has been read.

In some embodiments, each file may be associated with one or more file indexes stored in the index table. A file index may be any indicator that can be associated with a file. For example, a file index may be a number, string (e.g., a filename), other alphanumeric value, or other suitable indicator. In some embodiments, each chunk of the file may be associated with one of the file indexes of the file. Each file index may also be associated with the absolute address of the backup storage device at which the first chunk of that file index is stored.

In particular embodiments, if the data of a file is received without a lengthy interruption, the file may be associated with a single file index, and each chunk of the file may be associated with the file index. In some embodiments, if the reception of data is interrupted, an additional file index may be associated with the file and stored in the index table. The chunks written to the backup storage device up to the time that the additional file index is created may be associated with the first file index. The additional file index may be associated with the absolute address of the first chunk of the file written to the backup storage device after the interruption. Chunks written to the backup storage device after this chunk has been written and before an additional length interruption (if any) may also be associated with the additional file index. If additional interruptions are encountered, additional file indexes may be associated with the file and the chunks of the file may be associated to these additional file indexes in a manner similar to that described above. Each additional file index may also be associated with the absolute address of the first chunk associated with the file index. The utilization of file indexes may largely preserve the relative addressing scheme described above while maintaining the small size of the index table.

Some embodiments offer significant advantages over typical backup systems. In particular embodiments, the index table is significantly smaller than in a typical backup system and is accessed less frequently. This may result in better backup and restore performance, especially in multiplex backup and restore.

In the embodiment depicted in FIG. 1, system 100 includes storage device 108, backup system 104, data sources 112-114, restore system 154, and data requesters 162-164 coupled as shown. Backup system 104 may be any suitable combination of hardware and/or software for backing up and/or transmitting data from one or more data sources 112-114 to storage device 108. Restore system 154 may be any suitable combination of hardware and/or software for restoring and/or transmitting data from storage device 108 to one or more data requesters 162-164.

Various components shown in FIG. 1 (e.g., storage device 108, backup system 104, data sources 112-14, restore system 154, and/or data requesters 162-164) may include one or more portions of one or more computer systems. In particular embodiments, one or more of these computer systems may perform one or more steps of one or more methods described or illustrated herein. In particular embodiments, one or more computer systems may provide functionality described or illustrated herein. In some embodiments, encoded software running on one or more computer systems may perform one or more steps of one or more methods described or illustrated herein and/or provide functionality described or illustrated herein.

The components of one or more computer systems may comprise any suitable physical form, configuration, number, type, and/or layout. As an example, and not by way of limitation, one or more computer systems may comprise an embedded computer system, a system-on-chip (SOC), a single-board computer system (SBC) (such as, for example, a computer-on-module (COM) or a system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, one or more computer systems may be unitary or distributed; span multiple locations; span multiple machines; or reside in a cloud, which may include one or more cloud components in one or more networks.

Where appropriate, one or more computer systems may perform without substantial spatial or temporal limitation one or more steps of one or more methods described or illustrated herein. As an example, and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

In particular embodiments, a computer system may include a processor, memory, storage, and a communication interface. As an example, backup system 104 may comprise a computer system that includes processor 116, memory 128, storage 120, and communication interface 124. As another example, restore system 154 may comprise a computer system that includes processor 166, memory 178, storage 170, and communication interface 174. These components may work together in order to provide backup system and restore system functionality, such as backing up and restoring data using next relative addressing.

Each of processors 116 and 166 may be a microprocessor, controller, or any other suitable computing device, resource, or combination of hardware, stored software and/or encoded logic operable to provide, either alone or in conjunction with other components of backup system 104 and/or restore system 154, such as memory 128 or 178, backup system 104 and/or restore system 154 functionality. In some embodiments, one or more components (e.g., backup system 104 and/or restore system 154) of system 100 may utilize multiple processors to perform the functions described herein.

Storage device 108, memory 128, and/or memory 178 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. In some embodiments, storage device 108 may be operable to store backup data for one or more data sources 112-114 and provide the backup data to one or more data requesters 162-164.

Memories 128 and 178 may store any suitable data or information utilized by backup system 104 and restore system 154, including software embedded in a computer readable medium, and/or encoded logic incorporated in hardware or otherwise stored (e.g., firmware). In some embodiments, memories 128 and 178 may store information used by processors 116 and 166. In the embodiment depicted, memory 128 stores index table 132, push thread 136, write thread 140, and chunk queue 144; and memory 178 stores index table 182, initial address lists 186, and chunk position list 190. Memories 128 and 178 may also store the results and/or intermediate results of the various calculations and determinations performed by processors 116 and 166.

Backup system 104 may also comprise communication interface 124, which may be used for the communication of signaling and/or data between backup system 104 and one or more networks and/or components coupled to a network (e.g., storage device 108 and data sources 112-114). Restore system 154 may comprise a similar communication interface 174, which may be used for communication between restore system 154 and one or more networks and/or components coupled to a network (e.g., storage device 108 and data requesters 162-164).

In some embodiments, backup system 104 and restore system 154 (and/or one or more of their components) may be integrated. As an example, memories 128 and 178 may be the same memory. Similarly, in some embodiments, processors 116 and 166, storages 120 and 170, and/or communication interfaces 124 and 174 may be the same components. In some embodiments, an integrated system may be able to perform both backup and restore functions as described herein. In some embodiments, index tables 132 and 182 may be the same index table. In some embodiments, data from index table 132 of backup system 104 may be copied to index table 182 of restore system 154 (or otherwise provided to the restore system) to enable restore operations. In some embodiments, one or more data sources 112 may be integrated with one or more of data requesters 162-164. For example, data source 112 and data requester 162 may be the same computing system.

FIG. 2 depicts an example flow of multiplex backup using next relative addressing. In the embodiment depicted, various states of push thread 136, chunk queue 144, write thread 140, and storage device 108 are shown.

In some embodiments, data sources 112-114 may transmit one or more files to backup system 104 for storage on storage device 108. In some embodiments, backup system 104 may receive the files incrementally. In some embodiments, the files may be transmitted to backup system 104 in a multiplexed manner. For example, backup system may receive a portion of a first file, then a portion of a second file, then portion of a third file, then another portion of a first file, and so on. As another example, backup system may receive a portions of multiple files simultaneously.

As backup system 104 receives file data, push thread 136 may organize the data into data chunks. In the embodiment depicted, push thread 136 receives data from files 1, 2, and 3, and forms chunks associated with these files. The chunks are formed in order from left to right. That is, a chunk of file 1 is formed, then a chunk of file 2, then two more chunks of file 1, then a chunk of file 3, and so on.

In some embodiments, each file may be associated with a chunk size. A chunk size specifies the size of a chunk to be formed by push thread 136. As an example, if a chunk size of a file is 1 MB, the push thread 136 may organize data of the file into 1 MB chunks. In some embodiments, push thread 136 may form a data chunk associated with a file when a sufficient amount of data has been received from the file. As an example, if a chunk size of a file is 1 MB, push thread 136 may wait until it has received at least roughly 1 MB of data of the file before forming a data chunk associated with the file. In some embodiments, the chunk size may be any suitable size, such as 256 kilobytes (KB), 512 KB, 1 MB, 2 MB, 4 MB, 8 MB, or other size. In some embodiments, a set of allowable chunk sizes may be specified by a user.

In the embodiment depicted in FIG. 2, the chunks have a fixed size of 1 MB. However, in some embodiments, a chunk size may be dynamically adjusted. Dynamically adjusting the chunk size of a file has many advantages, including better utilization of space on storage device 108 and improved performance during backup and restore operations. In some embodiments, a chunk size associated with a file may be selected based on any suitable factors, such as the size of the file, the transmission rate from a data source 112 to backup system 104, the rate at which data is written from backup system 104 to storage device 108, or other suitable factors. As explained later, in some embodiments, the chunk size of a file may be adjusted based on the frequency with which push thread 136 forms chunks from data of the file. In some embodiments, a maximum chunk size and a minimum chunk size may be established such that the chunk size may not be increased above the maximum chunk size or decreased below the minimum chunk size.

In some embodiments, an initial chunk size associated with a file may be the maximum chunk size if the size of the file is larger than the maximum chunk size. In some embodiments, the initial chunk size of the file may be the smallest allowable chunk size that is large enough to hold the data of the file if the size of the file is smaller than the maximum chunk size. In some embodiments, if the chunk received is the last chunk of the file and is smaller than the current chunk size of the file, the chunk size may be adjusted to the smallest chunk size that is large enough to hold the data of the chunk and equal to or greater than the minimum chunk size.

After a chunk is formed by push thread 136, it may be pushed onto chunk queue 144. In some embodiments, when a chunk is pushed onto chunk queue 144, it is placed at the bottom of the chunk queue, and when a chunk is popped (or removed) from chunk queue 144, it is taken from the top of the chunk queue. In some embodiments, chunk queue 144 is a first in first out (FIFO) queue. In some embodiments, chunk queue 144 may include chunks of various files. In the embodiment depicted, various states 202-224 of chunk queue 144 are shown. At state 202, the first chunk of file 1 is pushed onto chunk queue 144. At this state, the first chunk of file 1 is at the bottom and the top of chunk queue 144. At state 203, the first chunk of file 2 is pushed onto chunk queue 144. At this state, the first chunk of file 1 is at the top of chunk queue 144 and the first chunk of file 2 is at the bottom of the chunk queue. At state 204, a second chunk of file 1 is pushed to chunk queue 144.

In various embodiments, one or more chunks of chunk queue 144 may be popped from the chunk queue and written to storage device 108. As an example, at state 205, write thread 140 pops the first chunk of file 1 (a popped chunk is denoted by dotted lines) from chunk queue 144 and the chunk is written to address 0 of storage device 108.

In certain embodiments, if the chunk popped from chunk queue 144 is the first chunk of a file, an entry may be made in index table 132 for the file. The entry may include the (absolute) address at which the first chunk of the file is stored on storage device 108. As an example, an entry for file 1 in index table 132 may include the address of the first chunk of file 1 (in this case 0). In some embodiments, when the first chunk of a file is written to storage device 108, a first file index may be recorded in index table 132 and associated with file 1. In some embodiments, the first file index may also be associated with the address of the storage device 108 to which the first chunk is written.

In various embodiments, a next relative address may be appended to the chunk popped from the chunk queue 144 before the chunk is written to storage device 108. In some embodiments, the next relative address may indicate a position in storage device 108 in which the next chunk associated with the same file will be stored. In some embodiments, the next relative address may indicate a position in storage device 108 that is relative to the address at which the popped chunk will be stored in storage device 108. For example, the next chunk associated with the file may be stored at an address of storage device 108 that may be calculated by adding the next relative address of the popped chunk to the address of the storage device at which the popped chunk is stored.

In some embodiments, the next relative address may be calculated based on a position of the next chunk associated with the same file in the chunk queue. As an example, the next relative address may be the aggregate size of the chunks in chunk queue 144 that were placed in the chunk queue before the next chunk of the same file. That is, in some embodiments, the next relative address appended to a chunk may be the distance between the top of chunk queue 144 (before the chunk is popped) and the position in the chunk queue of the next chunk associated with the same file as the chunk. At state 205 of the embodiment depicted, the next relative address appended to the first chunk of file 1 before it is written to storage device 108 is 2 MB. As depicted, when the second chunk of file 1 is written to storage device 108, it is stored at address 0 (address of first chunk)+2 MB (next relative address)=2 MB.

In the embodiment depicted, various next relative addresses 250-256 are shown for the chunks written to storage device 108. In the embodiment depicted, the next relative addresses are shown as relative to the address at the beginning of the respective chunks. In some embodiments, a next relative address may be expressed in any manner that allows identification of the next chunk associated with the respective file. For example, a next relative address could be expressed relative to the address at the end of the respective chunk.

In the embodiment depicted, the next relative address 250 of the first chunk of file 1 written to storage device is 2 MB, the next relative address 251 of the second chunk of file one is 4 MB, the next relative address 252 of the third chunk of file 1 is 1 MB, and the next relative address of the fourth chunk of file 1 is 3 MB. The next relative addresses 254-256 of the chunks associated with files 2 and 3 are also shown.

In some embodiments, the next relative address of a chunk may be calculated by any suitable component or combination of components of backup system 104. In some embodiments, the next relative address of a chunk may be calculated by push thread 136 or write thread 140. For example, in some embodiments, when a data chunk is pushed onto chunk queue 144, push thread 136 may search the chunk queue for a previous chunk of the same file and set the next relative address of that previous chunk. As another example, a next relative address may be calculated by push thread 136 and/or write thread 140 when a chunk is popped from the top of chunk queue 144.

In some situations, a chunk may be at the top of chunk queue 144, but another chunk of the same file may not be in the chunk queue. In some embodiments, a chunk queue threshold may be established. If chunk queue 144 does not include a chunk associated with the same file as the chunk at the top of the chunk queue, write thread 140 will not pop the top chunk of the chunk queue if the aggregate size of the chunks in chunk queue 144 is below the chunk queue threshold. In some embodiments, push thread 136 may continue pushing chunks to chunk queue 144 until either the chunk queue threshold is exceeded or a chunk of the same file as the top chunk is pushed onto the chunk queue. As an example, in the embodiment depicted, the chunk queue threshold is set at 3 MB. Thus, at states 203 and 206, for example, the top chunk is not written to storage device 108, but the next chunk is pushed to chunk queue 144 by push thread 136. In some embodiments, if the top chunk of chunk queue 144 is the last chunk of a file and/or file index, it may be popped regardless of whether the aggregate size is above the chunk queue threshold. As an example, at states 222-224, chunks of files 3, 2, and 1 are popped even though the chunk queue threshold is not exceeded.

In some embodiments, empty chunks may be used when there is a delay in the reception of data of a file during a multiplexed backup session. As an example, the chunk queue threshold may be exceeded and a data chunk of a file may be at the top of chunk queue 144 (and thus is ready to be written to storage device 108), but the chunk queue may not include another data chunk of the file. Thus, the next relative address of the data chunk cannot be set. In such cases an empty chunk associated with the file may be pushed on the chunk queue so that the next relative address of the data chunk may be set before it is written to storage device 108. In some embodiments, two types of empty chunks may be used: Empty chunk with next relative address ("empty chunk w/NRA") and empty chunk with next index ("empty chunk w/NI"). An empty chunk w/NRA may include a next relative address of a chunk associated with the same file. An empty chunk w/NI may be used to allow backup system 104 to stop writing empty chunks to storage device 108 when multiple chunks w/NRA have already been written. In some embodiments, each chunk may have an indicator that indicates whether it is a data chunk, an empty chunk w/NRA, or an empty chunk w/NI.

In some embodiments, if the chunk queue threshold is exceeded and chunk queue 144 does not include the next chunk of the same file as the top chunk, an empty chunk w/NRA is pushed to the chunk queue. In some embodiments, the empty chunk may be pushed onto chunk queue 144 by any suitable component or combination of components of backup system 104, such as write thread 140. The empty chunk w/NRA may be associated with the file of the top chunk and the next relative address of the top chunk may be set to point to the empty chunk w/NRA. At state 207 of the embodiment depicted, the size of the chunk queue (4 MB) exceeds the chunk queue threshold (3 MB) and chunk queue 144 does not include a second chunk associated with file 2. Accordingly, an empty chunk w/NRA is associated with file 2 (denoted by the chunk including an encircled numeral 2) and pushed onto the chunk queue. The next relative address of the first chunk of file 2 is then set based upon the position of the empty chunk w/NRA in chunk queue 144.

In some embodiments, the chunk size associated with a file may be decreased when an empty chunk associated with the file is pushed on chunk queue 144. For example, if the chunk size associate with a file is 1 MB and an empty chunk associated with that file is subsequently pushed on chunk queue 144, the chunk size may be decreased to 512 KB, and the empty chunk may have a size of 512 KB. If another empty chunk is received, the chunk size may be further decreased to 256 KB, and so on until the chunk size is equal to the minimum chunk size.

In some embodiments, if a predetermined number of successive empty chunks are pushed on chunk queue 144, the backup system 104 may determine that there is a problem with the file transfer from the data source to the backup system. Backup system 104 may stop pushing empty chunks w/NRA to chunk queue 144. The backup system may then push an empty chunk w/NI to chunk queue 144. In some embodiments, the empty chunk w/NI may be pushed when an empty chunk w/NRA would have been pushed if the predetermined number of successive empty chunks had not already been pushed. In some embodiments, the size of an empty chunk w/NRA is the minimum chunk size.

In some embodiments, an empty chunk w/NI is the last chunk associated with a particular file index. In some embodiments, an empty chunk w/NI does not include a next relative address of the next chunk of the file, but has an indicator that it is the last chunk of a file index. In some embodiments, when an empty chunk w/NI is pushed to chunk queue 144, a new file index associated with the file may be recorded in index table 132. In some embodiments, the new file index may be stored in the empty chunk w/NI.

When sufficient data of the file is again received by push thread 136, a data chunk of the file is formed and pushed to chunk queue 144. In some embodiments, the address of storage device 108 at which the data chunk will be written may be recorded in index table 132 and associated with the file. In some embodiments, the new index may be associated with the file and the address of the data chunk.

In some embodiments, the chunk queue threshold and/or the predetermined number of successive empty chunks may be selected based on system preferences. In some embodiments, if the speed of writing a chunk to storage device 108 is x MB/s and it is desired that an empty chunk w/NRA be written only once every n seconds, the chunk queue threshold may be set to x*n MB. For example, if the write speed is 30 MB/s and a user desires that an empty chunk of a file be pushed every two seconds if a data chunk of the file is not pushed to chunk queue 144, the chunk queue threshold may be set to 60 MB. In some embodiments, if a user desires that empty chunks stop being pushed to the chunk queue after m seconds (for example, there may be a problem with the transfer of data from data source 112 to backup system 104), the value of the predetermined number of successive empty chunks may be set to m/n-1. For example, if a user desires that empty chunks are pushed every 2 seconds but should stop being pushed after 20 seconds, the value of the predetermined number of successive empty chunks may be set to 9.

In some embodiments, after an empty chunk associated with a file has been pushed on chunk queue 144, push thread 136 may receive data from the file before the empty chunk is written to storage device 108. In some embodiments, the data received by the file may be placed in the empty chunk and the empty chunk may be converted to a data chunk before the empty chunk is popped from chunk queue 144 and written to storage device 108. In some embodiments, this action may be performed by any suitable component or combination of components, such as push thread 136. In some embodiments, the chunk maintains the same size when it is converted in order to maintain correct relative addressing for chunks that are higher in chunk queue 144 than the replaced chunk. By way of example, at states 213 and 215 respectively, empty chunks w/NRA associated with files 3 and 2 are pushed to chunk queue 144 by write thread 140. At steps 218 and 219, data from files 3 and 2 is received and the empty chunks w/NRAs are converted to data chunks of files 3 and 2.

In some embodiments, if an empty chunk w/NI is replaced before it is written to storage device 108, a new index that has been associated with the file in index table 132 may be removed. In some embodiments, when an empty chunk is replaced, a counter that tracks the number of successive empty chunks associated with a file may be reset to zero. Replacing empty chunks with data chunks may conserve space on the storage device 108 and limit the number of entries in index table 132.

In some embodiments, a chunk size of a file may be increased if chunk queue 144 includes a predetermined number of chunks associated with the file. As an example, if ten chunks associated with a file are in chunk queue 144, the chunk size of the file may be increased from 1 MB to 2 MB. Thus, if push thread 136 subsequently receives data of the file, it will put this data in a data chunk of size 2 MB.

In some embodiments, two or more chunks associated with a file may be merged into one chunk and then written to storage device 108. In some embodiments, two chunks may be merged if they are adjacent each other in chunk queue 144 and the next relative address of the merged chunk can be set. In some embodiments, write thread 140 may pop the top chunk from chunk queue 144 and check to see if the new top chunk of chunk queue 144 is associated with the same file index as the popped chunk. If it is, and the chunk queue includes at least one other chunk associated with the same file index, the popped chunk and the top chunk are merged and the next relative address of the merged chunk is set. In some embodiments, this process may be repeated one or more times. That is, the two chunks may be merged and then the new top chunk of the chunk queue may be examined to see whether it is associated with the same file index as the merged chunk. If it is, and the queue includes at least one other chunk of the same index, the new top chunk is merged with the merged chunk. In some embodiments, the merged chunk may exceed the maximum chunk size.

As an example, at state 210, a chunk associated with file 1 is popped from chunk queue 144 and the top chunk of the chunk queue is another chunk associated with file 1. Chunk queue 144 also includes another chunk of file 1 located at the bottom of the chunk queue. The popped chunk and the chunk at the top of the chunk queue are merged and the next relative address is set to point to the chunk at the bottom of the chunk queue.

In some embodiments, if two chunks are at the top of the chunk queue, but no other chunk associated with the same file is in the chunk queue, the chunks will not be merged. This enables the backup system to push at least one more data chunk to the chunk queue before it pushes an empty chunk associated with the file onto the chunk in order to set the next relative address of the top chunk. In some situations, the data chunk pushed onto the chunk queue will be associated with the file, thus allowing the next relative address of the second data chunk to be set without requiring that an empty chunk be pushed on the chunk queue. As an example, at state 217 in the embodiment depicted, write thread 140 is unable to find an additional chunk associated with file 1 and thus does not merge the two chunks associated with file 1 at the top of chunk queue 144.

In some embodiments, absolute addresses can be used in the place of, or in addition, to relative addresses. For example, each chunk of a file (except the last chunk of a file index) written to backup device 108 could include an absolute address of the next chunk associated with the file. In some embodiments, an absolute address of a chunk may be calculated in any suitable manner. For example, backup system 104 could determine the next relative address for a chunk and then add this to the absolute address of the chunk that was most recently written to backup device 108 and is associated with the same file. In some embodiments the absolute address of a chunk may indicate the position of storage device 108 to which the next chunk associated with the file will be written.

In some embodiments, restore system 154 may receive a request from a data requester 162 to read a file stored on storage device 108. Restore system 154 is operable to read the file from storage device 108 and transmit the data of the file to the data requester 162. In some embodiments, restore system 154 may access index table 182 to determine the address of the first data chunk of the file. For example, in some embodiments, restore system 154 may access index table 182 to determine the address associated with the first file index associated with the file. The restore system may read the first data chunk by accessing storage device 108 at the address of the first data chunk. Restore system 154 may then identify an address appended to the first data chunk. The address may indicate a position on storage device 108 of the next (i.e., second) chunk of the file. In some embodiments, the address may be an absolute address or a next relative address. Restore system 154 may then read the second chunk by accessing storage device 108 at the position of the storage device indicated by the address. In some embodiments, the address is a next relative address that indicates a position of the storage device that is relative to the address of the first data chunk. As an example, the next relative address may be added to the address of the first data chunk and the result may indicate the absolute address of the second chunk.

After the second chunk has been read, an address appended to the second chunk may be identified and used to read a third chunk. In some embodiments, this process may continue until the last chunk of a file index associated with the file is read. If the file has a single file index associated with it, then the reading of the file is complete. If the file has multiple file indexes, the address of the first chunk of the second file index associated with the file may be obtained. In some embodiments, this address may be obtained from index table 182 or from another data structure derived from the index table. The chunks of the second file index (and any additional file indexes associated with the file) may be processed in a manner similar to that described above. The reading of the file is complete when each of the chunks of each file index associated with the file have been read.

In some embodiments, restore system 154 may restore files in a multiplexed manner. FIG. 3 depicts an example method of multiplex restore using next relative addressing. The method begins at step 300. At step 304, restore system 154 receives one or more requests from data requesters 162-164 to read multiple files from storage device 108. In some embodiments, each request may indicate one or more files to be read from storage device 108. In some embodiments, restore system 154 may process these requests in a multiplexed manner. That is, restore system 154 may perform part of a first request (e.g., by reading a chunk of a first file), then part of another (e.g., by reading a chunk of a second file), then another part of the first request (e.g., by reading a second chunk of the first file), and so on until each request is complete. In some embodiments, one or more file sessions may be set up between the restore system and one or more of data requesters 162-164 to facilitate the reading of the files.

In some embodiments, restore system 154 may generate an initial address list 186 for each request. In some embodiments, each of the initial address lists 186 may comprise one or more nodes. Each node may comprise an address of a chunk of a requested file. In some embodiments, the addresses of the nodes may be determined by accessing index table 182. In some embodiments, each node may also comprise a file index associated with the address of the node. The nodes of initial address lists 186 may collectively comprise one or more addresses of each file requested. The addresses may each indicate a position of storage device 108. In some embodiments, the initial address lists 186 may comprise the address of the first data chunk of each file of the request. In some embodiments, the initial address lists may comprise the address of the first data chunk of each file index associated with a file of the request. In some embodiments, the nodes of each of the initial address lists 186 may be arranged in order according to their respective addresses. In some embodiments, the nodes may be arranged according to an ascending order of the positions of storage device 108 that correspond to the addresses of the nodes.

At step 312, a node from each initial address list 186 is removed from its respective initial address list and placed into chunk position list 190. In some embodiments, the nodes placed into chunk position list 190 are each the minimum node (i.e., the node with the lowest address) of their respective initial address list 186. Thus, in some embodiments, the chunk position list may comprise a set of nodes that collectively comprise an address of a data chunk of one file of each request. In some embodiments, the nodes of chunk position list 190 may be ordered (e.g., arranged in ascending order) according to the addresses of the respective nodes.

At step 316, the minimum node of chunk position list 190 is identified and removed from the chunk position list. The address of the minimum node is then identified. The first time step 316 is performed, the address of the minimum node will be an address of a first data chunk of one of the files of the requests. When step 316 is subsequently performed, the address of the minimum node may be the address of a different chunk associated with the same file or the first data chunk of a different file.

At step 320, the chunk at the address specified by the minimum node is read from storage device 108 by accessing the storage device at the position corresponding to the address. In some embodiments, if the chunk is a data chunk, the data is extracted from the chunk and sent to the data requester 162 that requested the file. In some embodiments, data extracted from chunks associated with a file may be accumulated before the data is transmitted to data requester 162. At step 324, the chunk is checked to determine whether it is the last chunk of a file index associated with the file. In some embodiments, restore system 154 may accomplish this by checking a variable that is set if the chunk is the last chunk of a file index associated with the file.

If the chunk is not the last chunk of the file index, the minimum node is updated at step 328. An address appended to the chunk may be identified. In some embodiments, the address may indicate a position on storage device 108 where the next chunk of the file is stored. In some embodiments, the address may be a next relative address that indicates a position of storage device 108 that is relative to the address specified by the minimum node (i.e., the address of the chunk that was just read). In some embodiments, a new address of the minimum node may be calculated based on the address of the chunk and the next relative address specified by the chunk. In some embodiments, the next relative address may be added to the address of the minimum node to determine the new address of the minimum node. The minimum node is then placed back into the position list, where it may or not be the minimum node of the chunk position list for the next iteration.

In some embodiments, steps 316, 320, 324, and 328 may be repeated until restore system 154 reads a chunk from storage device 108 that is the last chunk of a file index. After transferring the data (if any) of the last chunk, the initial address list 186 corresponding to the file associated with the chunk is checked at step 332. If the initial address list 186 has at least one node left, the minimum node of the initial address list is placed into chunk position list 190 and the method loops back to step 316. If the initial address list is empty, then restore system has finished reading each file identified by the request corresponding to that initial address list. The chunk position list 190 is checked at step 336. If the chunk position list is not empty, the method loops back to step 316. If the chunk position list is empty, the restore system 154 has finished reading the chunks of the files of each request and the method ends at step 344. In some embodiments, one or more steps of the method may be repeated when additional requests are received.

Modifications, additions, or omissions may be made to the systems and apparatuses disclosed herein without departing from the scope of the disclosure. The components of the systems and apparatuses may be integrated or separated. For example, backup system 104 and restore system 154 (and/or their respective components) may be integrated. Moreover, the operations of the systems and apparatuses may be performed by more, fewer, or other components. For example, the operations of backup system 104 and 154 may be performed by one or more systems. As another example, the operations of push thread and write thread may be performed by one component or more than one component. As another example, index table 132 and/or index table 182 may be stored in a separate computing system coupled to backup system 104 and/or restore system 154, such as an Structured Query Language (SQL) server. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the disclosure. The method may include more, fewer, or other steps. Additionally, steps may be performed in any suitable order.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method, comprising:
   determining whether a delay has occurred in receiving a file being stored on a storage device;
   in response to determining that a delay has occurred, writing an empty chunk to the storage device;
   identifying an address of a first data chunk of the file stored on the storage device;
   reading the first data chunk by accessing the storage device at the address of the first data chunk;
   identifying a next relative address appended to the first data chunk, the next relative address indicating a position of a next chunk, the next chunk comprising the empty chunk and information indicative of a position of a further chunk associated with the file; and
   reading the next chunk by accessing the storage device at the position indicated by the next relative address.

2. The method of claim 1, the next relative address indicating a position of the storage device that is relative to the address of the first data chunk.

3. The method of claim 1, further comprising:
   receiving a request indicating one or more files to read from the storage device; and
   generating an initial address list comprising an address for each file of the one or more files, each address indicating a position of the storage device where a first data chunk of the respective file is stored.

4. The method of claim 1, further comprising:
   receiving one or more requests, each request indicating corresponding one or more files to read from the storage device; and
   generating a chunk position list comprising an address of a data chunk of the corresponding one or more files of each request.

5. The method of claim 1, the identifying an address of a first data chunk of the file further comprising:
   identifying the minimum address of a chunk position list, the chunk position list comprising a plurality of addresses, each address indicating the position of a data chunk of a distinct file of a plurality of files.

6. The method of claim 1, further comprising:
   calculating an address of the next chunk based on the address of the first data chunk and the next relative address; and
   inserting the address of the next chunk into a chunk position list that comprises a plurality of chunk addresses, each chunk address indicating a position of a chunk associated with a distinct file of a plurality of files.

7. The method of claim 1, further comprising:
   reading a last chunk of a first file index, the first file index associated with the file;
   accessing an index table to identify an address of a first chunk of a second file index, the second file index associated with the file; and
   reading the first chunk of the second file index.

8. One or more tangible non-transitory computer-readable media having computer-executable code, when executed by a computer operable to:
   determine whether a delay has occurred in receiving a file being stored on a storage device;
   in response to determining that a delay has occurred, writing an empty chunk to the storage device;
   identify an address of a first data chunk of the file stored on the storage device;
   read the first data chunk by accessing the storage device at the address of the first data chunk;
   identify a next relative address appended to the first data chunk, the next relative address indicating a position of a next chunk, the next chunk comprising the empty chunk and information indicative of a position of a further chunk associated with the file; and
   read the next chunk by accessing the storage device at the position indicated by the next relative address.

9. The media of claim 8, the next relative address indicating a position of the storage device that is relative to the address of the first data chunk.

10. The media of claim 8, further operable to:
    receive a request indicating one or more files to read from the storage device; and
    generate an initial address list comprising an address for each file of the one or more files, each address indicating a position of the storage device where a first data chunk of the respective file is stored.

11. The media of claim 8, further operable to:
    receive one or more requests, each request indicating corresponding one or more files to read from the storage device; and generate a chunk position list comprising an address of a data chunk of the corresponding one or more files of each request.

12. The media of claim 8, the identifying an address of a first data chunk of the file further comprising:
identifying the minimum address of a chunk position list, the chunk position list comprising a plurality of addresses, each address indicating the position of a data chunk of a distinct file of a plurality of files.

13. The media of claim 8, further operable to:
calculate an address of the next chunk based on the address of the first data chunk and the next relative address; and
insert the address of the next chunk into a chunk position list that comprises a plurality of chunk addresses, each chunk address indicating a position of a chunk associated with a distinct file of a plurality of files.

14. The media of claim 8, further operable to:
read a last chunk of a first file index, the first file index associated with the file;
access an index table to identify an address of a first chunk of a second file index, the second file index associated with the file; and
read the first chunk of the second file index.

15. An apparatus, comprising:
a memory; and
one or more processors coupled to the memory and configured to:
determine whether a delay has occurred in receiving a file being stored on a storage device;
in response to determining that a delay has occurred, writing an empty chunk to the storage device;
identify an address of a first data chunk of the file stored on the storage device;
read the first data chunk by accessing the storage device at the address of the first data chunk;
identify a next relative address appended to the first data chunk, the next relative address indicating a position of a next chunk, the next chunk comprising the empty chunk and information indicative of a position of a further chunk associated with the file; and
read the next chunk by accessing the storage device at the position indicated by the next relative address.

16. The apparatus of claim 15, the next relative address indicating a position of the storage device that is relative to the address of the first data chunk.

17. The apparatus of claim 15, the one or more processors further operable to:
receive a request indicating one or more files to read from the storage device; and
generate an initial address list comprising an address for each file of the one or more files, each address indicating a position of the storage device where a first data chunk of the respective file is stored.

18. The apparatus of claim 15, the one or more processors further operable to:
receive one or more requests, each request indicating corresponding one or more files to read from the storage device; and
generate a chunk position list comprising an address of a data chunk of the corresponding one or more files of each request.

19. The apparatus of claim 15, the identifying an address of a first data chunk of the file further comprising:
identifying the minimum address of a chunk position list, the chunk position list comprising a plurality of addresses, each address indicating the position of a data chunk of a distinct file of a plurality of files.

20. The apparatus of claim 15, the one or more processors further operable to:
calculate an address of the next chunk based on the address of the first data chunk and the next relative address; and
insert the address of the next chunk into a chunk position list that comprises a plurality of chunk addresses, each chunk address indicating a position of a chunk associated with a distinct file of a plurality of files.

21. The apparatus of claim 15, the one or more processors further operable to:
read a last chunk of a first file index, the first file index associated with the file;
access an index table to identify an address of a first chunk of a second file index, the second file index associated with the file; and
read the first chunk of the second file index.

* * * * *